United States Patent [19]

Brandenstein et al.

[11] Patent Number: 4,732,495
[45] Date of Patent: Mar. 22, 1988

[54] ARRANGEMENT FOR ADJUSTMENT OF ROLLING BEARING

[75] Inventors: Manfred Brandenstein, Eussenheim; Rudolf Wolter, Schweinfurt; Horst M. Ernst, Eltingshausen, all of Fed. Rep. of Germany

[73] Assignee: SKF GmbH, Schweinfurt, Fed. Rep. of Germany

[21] Appl. No.: 936,318

[22] Filed: Dec. 1, 1986

[30] Foreign Application Priority Data

Nov. 29, 1985 [DE] Fed. Rep. of Germany ... 8533642[U]

[51] Int. Cl.$^4$ .................. F16C 33/64; F16C 33/58; F16C 25/08
[52] U.S. Cl. .................................. 384/518; 384/564; 384/611
[58] Field of Search ............... 384/518, 513, 517, 535, 384/564, 581, 563, 611

[56] References Cited

U.S. PATENT DOCUMENTS

| 1,517,060 | 11/1924 | Hanson | 384/518 |
|---|---|---|---|
| 1,881,750 | 10/1932 | Llewellyn | 384/518 |
| 1,923,777 | 8/1933 | Delaval-Crow | 384/518 |
| 2,195,795 | 4/1940 | Baker | 384/564 |
| 2,704,696 | 3/1955 | Rasmussen | 384/611 |
| 3,097,539 | 7/1963 | Opocensky | 384/518 X |
| 4,227,755 | 10/1980 | Lundberg | 384/518 |
| 4,529,324 | 7/1985 | Champagne et al. | 384/518 |

FOREIGN PATENT DOCUMENTS

| 118665 | 6/1944 | Australia | 384/611 |
|---|---|---|---|
| 3514771 | 10/1986 | Fed. Rep. of Germany . | |
| 184318 | 10/1983 | Japan | 384/518 |
| 2100367 | 12/1982 | United Kingdom | 384/518 |

Primary Examiner—Stuart S. Levy
Assistant Examiner—Thomas R. Hannon
Attorney, Agent, or Firm—Rosen, Dainow & Jacobs

[57] ABSTRACT

An arrangement for adjustment of a rolling bearing which is radially and axially movable inside a sleeve. A helical spring is arranged with prestress between the base of the sleeve and a side surface of the outer ring of the rolling bearing. The terminal windings of the spring are radially restrained by form-locking with projections on the base and the side surface.

5 Claims, 3 Drawing Figures

ARRANGEMENT FOR ADJUSTMENT OF ROLLING BEARING

FIELD OF THE INVENTION

The invention relates to an arrangement for adjustment of a rolling bearing which is radially movable and axially slidable, the arrangement including a sleeve having a base within which an outer ring with a side surface is arranged, and a helical spring arranged between the base and side surface with prestress.

BACKGROUND OF THE INVENTION

Springs for use in the aforementioned construction are installed at different places in accordance with engineering technology. Such springs are made of wound spring steel wire and comprise a plurality of windings. Most compression springs abut the corresponding contact surfaces by way of the terminal windings, e.g. by reducing the pitch of the last winding so that it is bent to nearly extend in the radial plane. The face of the bent winding often undergoes grinding so that a precise contact surface is formed.

In practice it appears that compression springs manufactured in accordance with specifications cannot be installed in the aforementioned constructional arrangement or can be installed only with considerable deficiencies. During compression of such a known spring under a precisely axially directed force, this force will not be transmitted in a uniformly axial direction to the contact surface opposing the other end of the spring. The known spring produces a radially directed force component on this contact surface. Thus in a known construction of a rolling bearing in which the base of a sleeve forms the contact surface, the spring is radially prestressed and can be radially displaced. The entire arrangement accordingly cannot ensure coaxial alignment. Since the radially directed force component is constantly changing during the spring excursion, this must be compensated for by constantly varying displacement of the rolling bearing, for example.

Particularly during impulsive loading, the spring is radially displaced on its contact surface so that the relative positions of the sleeve, the helical spring, and the rolling bearing, and the radial forces transmitted from one component to another, are constantly changing. The difficulty also arises that a precise coaxial guiding of the helical spring is not possible because different diameters are required for guiding a spring which is inclined relative to the spring excursion. Therefore a radial play between the sleeve and the helical spring must be provided which eliminates the aforementioned disadvantageous consequence.

SUMMARY OF THE INVENTION

The object of the invention is to improve a helical spring in the aforementioned working position such that the rolling bearing undergoes reduced radial forces in all axial positions.

The object is realized by radially form-locking the terminal windings at both ends of the helical spring in place by means of projections provided on the sleeve and the rolling bearing.

As a result the contact surfaces of the helical spring can no longer be radially displaced either on the base of the sleeve or on the side surface of the outer ring. The helical spring can, however, be arranged with a small radial play to compensate for the manufacturing tolerances of the component parts without sacrificing the desired result. The radial form-locking is confined to the respective terminal windings at the two ends of the helical spring. As a result the other windings therebetween can be axially as well as radially freely moved and can undergo an inner tension according to their corresponding positions along the entire unimpeded spring excursion. Furthermore, nearly no friction occurs on the bore surface of the sleeve, whereby the entire spring excursion takes place without braking effects and radial restoring forces. Since at times the terminal windings of the helical spring generally abut the adjacent windings and the faces of the terminal windings are oriented in the radial plane, the terminal windings make only a very limited contribution to the spring action. That is, the radial widening of the terminal windings in the compressed condition of the helical spring is much smaller than that of the windings therebetween. This radial form-locking in accordance with the invention is very advantageous because the degree of form-locking remains relatively constant, although it is influenced by the movement of the helical spring. As a result of the form-locking in accordance with the invention, the rolling bearing substantially remains in a coaxial position with the sleeve, i.e. the radial forces, which cause a radial offset, are reduced to a minimum.

In accordance with further features of the invention, the form-locking is achieved by providing an annular projection which extends inside the bore of the spring or which extends along the outside of the peripheral surface of the helical spring. Alternatively the sleeve can be provided with a plurality of circumferentially distributed, axially extending, radially stamped depressions. Furthermore, it is possible to arrange the outer ring of the rolling bearing in a thin-walled encasing sleeve having an annular projection for restraining the helical spring.

BRIEF DESCRIPTION OF THE DRAWINGS

The preferred embodiments of the invention will be described in detail with reference to the drawings.

DETAILED DESCRIPTION OF THE PREFERRED EMBODIMENT

Figure 1:
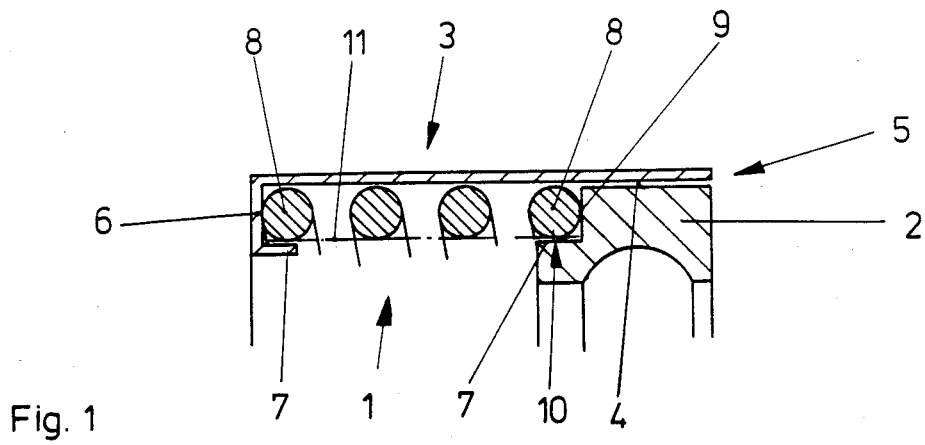
FIG. 1 is a partial longitudinal sectional view of a helical spring radially form-locked by means of engaging projections arranged in the bore.

The unit depicted in FIG. 1 comprises a helical spring 1, an outer ring 2 of a rolling bearing, and a sleeve 3, each of which is only partly shown. This unit serves, for example, in the play-free arrangement of a shaft, which shaft in turn must be axially elastically compliantly arranged by way of the bearing inner ring. Therefore the outer ring 2 has an outer diameter which is smaller than the bore surface 4 of sleeve 3, so that an annular gap 5 is produced. As a result the outer ring 2, when radially displaced slightly, can remain freely movable in the quiescent condition and does not contact the bore surface 4 of the sleeve 5. In order to satisfy these requirements, annular projections 7 are formed on the side surface of outer ring 2 and on the base 6 of sleeve 3, which projections extend into the bore 11 of helical spring 1, but only overlapping the area of the respective terminal windings 8. These projections 7 center the helical spring 1 relative to the sleeve 3 and the outer ring 2 and substantially prevent relative sliding of the front end of the helical spring 1 on the contact surface 9. In order to encompass manufacturing tolerances, a corresponding small radial play 10 is provided between the bore 11 of helical spring 1 and the projections 7.

Figure 2:
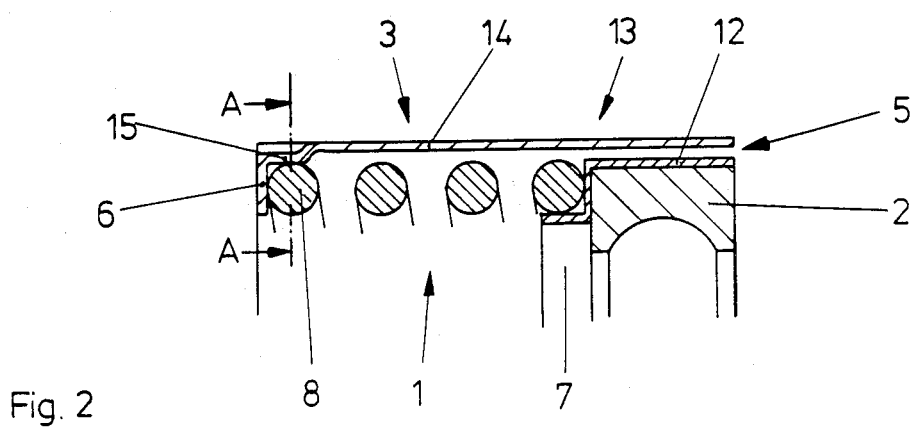
FIG. 2 is a partial longitudinal sectional view of a helical spring radially form-locked by means of radial depressions in a sleeve and an encasing sleeve on the outer ring of the bearing.
Figure 3:
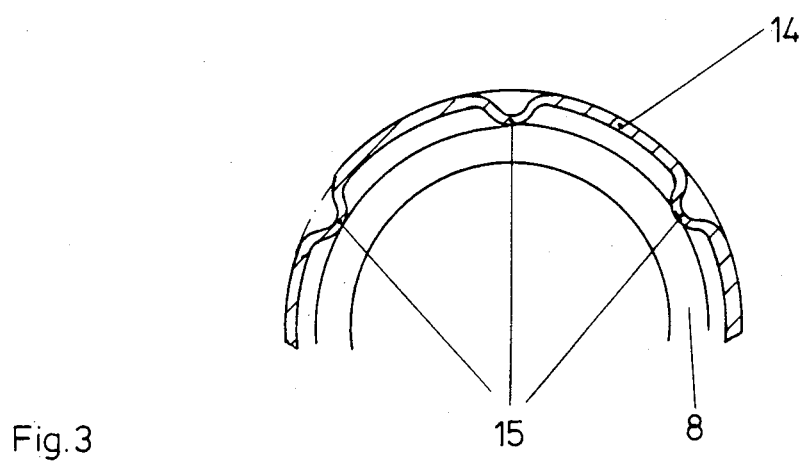
FIG. 3 is a partial cross-sectional view along the line A—A in FIG. 2.

In accordance with the preferred embodiment depicted in FIGS. 2 and 3, the outer ring 2 is arranged in a thin-walled encasing sleeve 12 which is provided with an annular projection 7 for forming a stepped shoulder. The sleeve 3 has a plurality of circumferentially distributed stamped depressions 15 projecting radially inward from the sleeve casing 14 in the vicinity of base 6, which depressions abut the peripheral surface or line of the terminal winding 8 of helical spring 7 and radially hold the terminal winding by form-locking. Also here a radial play can be provided as necessary which is small relative to the possible radial displacement of the outer ring 2.

The foregoing description of the preferred embodiments is presented for illustrative purposes only and is not intended to limit the scope of the invention as defined in the appended claims. Modifications may be readily effected by one having ordinary skill in the art without departing from the spirit and scope of the inventive concept herein disclosed.

What is claimed is:

1. An arrangement for adjustment of a rolling bearing having an outer ring with a side surface, said arrangement including a sleeve in which said outer ring is radially and axially movably arranged, said sleeve having a base connected thereto, a helical spring arranged with prestress between said base and said side surface of said outer ring, first projection means connected to said base and second projection means connected to said outer ring, whereby said first and second projection means are radially displaceable relative to each other, said helical spring being arranged to radially form-lock with said first and second projections means by means of terminal windings at respective ends of said helical spring, where in said first projection means comprises a plurality of circumferentially distributed, axially extending, radially stamped depressions in said sleeve.

2. The arrangement as defined in claim 1, wherein said helical spring has a bore, and said first and second projection means comprise annular projections which extend into said bore.

3. The arrangement as defined in claim 1, wherein one of said first and second projection means comprises a portion which extends along the outer periphery of said helical spring.

4. The arrangement as defined in claim 1, wherein said first projection means comprises a plurality of circumferentially distributed, axially extending, radially stamped depressions in said sleeve.

5. The arrangement as defined in claim 1, wherein said second projection means comprises an annular projection formed as part of a thin-walled sleeve which encases said outer ring.

* * * * *